(12) United States Patent
Tanaka

(10) Patent No.: US 8,033,493 B2
(45) Date of Patent: Oct. 11, 2011

(54) LEADER BLOCK ROTATING MECHANISM, READ/WRITE DEVICE, AND METHOD OF ROTATING LEADER BLOCK

(75) Inventor: Atsushi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1342 days.

(21) Appl. No.: 11/431,048

(22) Filed: May 10, 2006

(65) Prior Publication Data

US 2006/0255199 A1 Nov. 16, 2006

(30) Foreign Application Priority Data

May 12, 2005 (JP) ................................. 2005-139894

(51) Int. Cl.
*G11B 15/66* (2006.01)
(52) U.S. Cl. ................................................. 242/332.4
(58) Field of Classification Search ............... 242/332.4, 242/332.8, 532.1, 532.6, 582; 360/132
See application file for complete search history.

(56) References Cited

U.S. PATENT DOCUMENTS

| | | | | |
|---|---|---|---|---|
| 4,828,201 A * | 5/1989 | Smith | ............... | 242/332.4 |
| 6,320,722 B1 * | 11/2001 | Tsuchiya et al. | ........... | 360/96.51 |
| 6,322,014 B1 * | 11/2001 | Nemeth | ...................... | 242/332.4 |
| 6,378,796 B1 * | 4/2002 | Hamming et al. | ......... | 242/332.4 |
| 6,471,150 B1 * | 10/2002 | Tsuchiya et al. | ........... | 242/332.4 |
| 6,889,928 B2 * | 5/2005 | Tsuchiya | ................... | 242/332.4 |
| 7,063,286 B2 | 6/2006 | Masuda | | |
| 7,367,521 B2 * | 5/2008 | Shimanuki | ................ | 242/332.4 |
| 2004/0144878 A1 * | 7/2004 | Tsuchiya | .................. | 242/332.4 |
| 2005/0279873 A1 * | 12/2005 | Shimanuki | ................ | 242/332.4 |
| 2008/0173746 A1 | 7/2008 | Nishimura et al. | | |

FOREIGN PATENT DOCUMENTS

| | | |
|---|---|---|
| JP | 2001-135003 A | 5/2001 |
| JP | 2004-171701 A | 6/2004 |
| JP | 2004-220713 | 8/2004 |
| JP | 2004-220713 A | 8/2004 |
| WO | 2006/030688 A1 | 3/2006 |

OTHER PUBLICATIONS

Japanese Office Action dated Feb. 25, 2009 with Partial English-Language Translation.
Chinese Office Action dated Mar. 20, 2009 with partial English-language translation.
Chinese Office Action dated Sep. 25, 2009 with an English translation.

* cited by examiner

*Primary Examiner* — William A Rivera
(74) *Attorney, Agent, or Firm* — McGinn IP Law Group, PLLC

(57) ABSTRACT

A leader block rotating mechanism for selectively rotating a leader block to a holding position of holding a film of a web, and to a release position of releasing the film of the web, includes an elastic member that biases the leader block to the holding position.

18 Claims, 8 Drawing Sheets

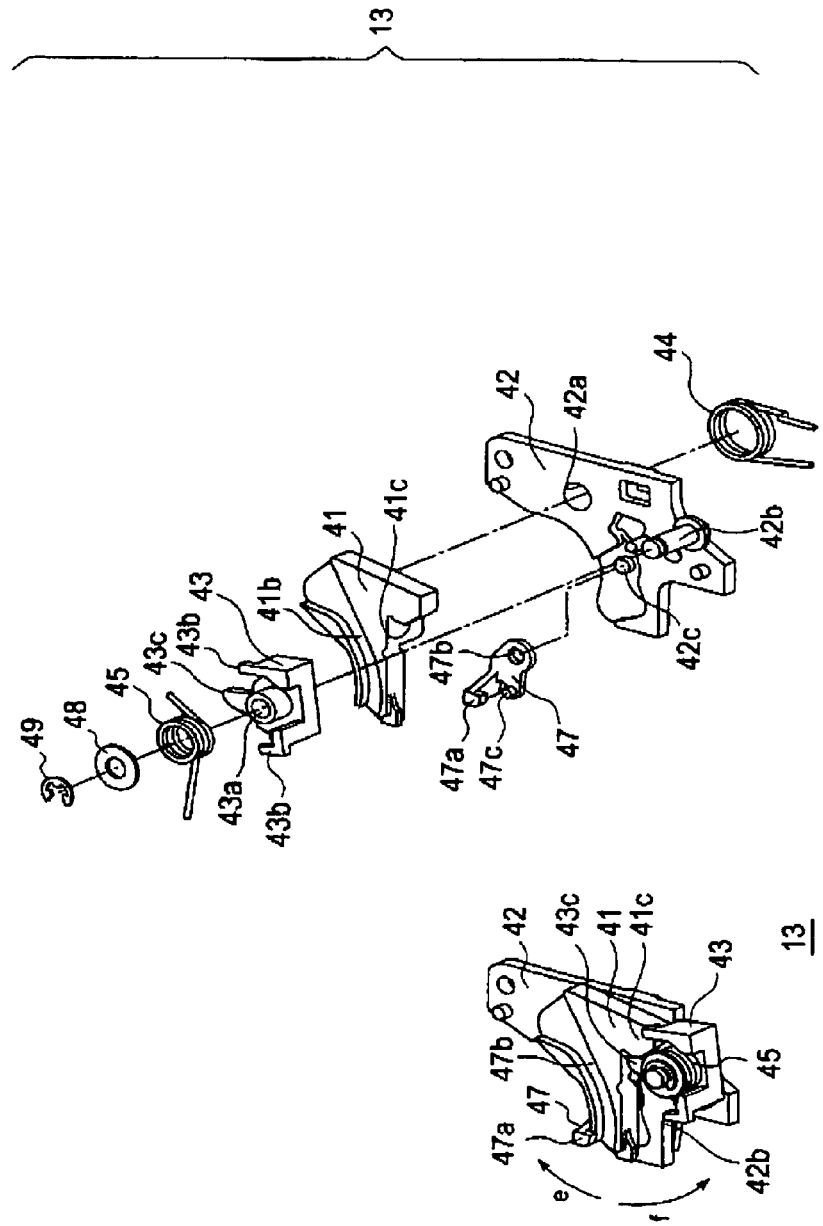

LEADER BLOCK ROTATING MECHANISM, READ/WRITE DEVICE, AND METHOD OF ROTATING LEADER BLOCK

BACKGROUND OF THE INVENTION

The present invention relates to a leader block rotating mechanism, a read/write device, and a method of rotating a leader block. For example, the present invention relates to a leader block rotating mechanism for rotating a leader block holding a film of a web (e.g., a leader pin of a magnetic tape cartridge), and a web (e.g., a tape) cartridge driving unit equipped with this leader block rotating mechanism).

As a web (e.g., a magnetic tape cartridge in which a magnetic tape is contained), for example, an LTO (Linear Tape-Open) system of a cartridge for data storage is known. A reel around which a magnetic tape is wound is contained in this kind of magnetic tape cartridge, and a leader pin is provided in an end of the magnetic tape.

The web driving unit, for example, the tape cartridge driving unit, for performing recording and reproduction for information to the magnetic tape of this magnetic tape cartridge, includes a loading mechanism for transporting the magnetic tape cartridge inside a unit, a threading mechanism having a leader block holding the leader pin of the magnetic tape cartridge and for drawing the magnetic tape in a unit side reel, and a leader block rotating mechanism for rotating the leader block to a holding position of holding the leader pin, and to a release position of releasing holding of the leader pin.

A conventional leader block rotating mechanism, includes a leader block picker for rotating a leader block, a rotator lever which rotates this leader block picker, a torsion spring which energizes this rotator lever, a rotator cam which rotates the rotator lever, and an extension spring which energizes this rotator cain (for example, refer to Japanese Patent Laid-Open No. 2004-220713).

In this conventional leader block rotating mechanism, the leader block picker rotating the leader block waits in a state of rotating the leader block to a release position by a bias (e.g., an energizing force) of each coil spring. Then, the leader block is rotated to the holding position of holding the leader pin by the leader block picker rotating while resisting the bias (e.g., the energizing force) of each coil spring by the rotator cam rotated by a cam portion provided in a gear rotatably driven by a motor.

SUMMARY OF THE INVENTION

As mentioned above, in the conventional leader block rotating mechanism disclosed in Japanese Patent Laid-Open No. 2004-220713, an initial state of the leader block picker rotating the leader block is made in a state of rotating the leader block to a releasing position, and each coil spring performs biasing (e.g., energization) to this state. In this leader block rotating mechanism, the leader pin is held in the leader block by the leader block picker being rotated in a state of rotating the leader block in the holding position by a driving force of a motor.

Then, when releasing the holding state of the leader pin by the leader block, the leader block picker shifts to a state of rotating the leader block to the release position by biases (e.g., energizing forces) by the coil spring, or the driving force of the motor being used for this auxiliary energizing force. Thus, the conventional leader block rotating mechanism rotates the leader block to the release position by rotating the leader block picker by the bias (e.g., energizing force) of the coil spring. Hence, the holding state of the leader pin by the leader block may not be released when the leader block is not rotated to the release position satisfactorily by reduction of the bias (e.g., energizing force) of the coil spring in connection with a time-dependent change, and the like.

In this manner, when a failure arises, for example, a magnetic tape is drawn from a magnetic tape cartridge without the holding state of the leader pin by the leader block being released, it may be difficult to eject the magnetic tape cartridge from an interior space of a recording/reproduction unit, since the magnetic tape would be damaged. Hence, data recorded on the magnetic tape may not be available for use, until the tape cartridge driving unit is repaired. Therefore, in the leader block rotating mechanism, it may be necessary to release securely the holding state of the leader pin by the leader block by rotating securely the leader block picker in the state of rotating the leader block to the release position.

In addition, in a conventional leader block rotating mechanism, since an entire mechanism in which a driving force by a motor is transferred is complex, it may be obstructed to achieve the miniaturization of the whole tape cartridge driving unit may be difficult.

In view of the foregoing and other exemplary problems, drawbacks, and disadvantages of the conventional techniques, it is an exemplary feature of the present invention to provide a leader block rotating mechanism, a read/write device, and a method of rotating a leader block which may have the improved reliability of operation of releasing the holding state of the web (e.g., the leader pin of the tape) by the leader block and may simplify the construction.

The present invention provides a leader block rotating mechanism for selectively rotating a leader block to a holding position of holding a film of a web, and to a release position of releasing the film of the web, including an elastic member that biases the leader block to the holding position.

The present invention also provides a read/write device for a web, including the leader block rotating mechanism in claim 1, and the leader block that holds the film of the web.

The present invention also provides a leader block rotating mechanism for selectively rotating a leader block to a holding position of holding a film of a web, and to a release position of releasing the film of the web, including a motor that drives rotation of the leader block to the release position.

The present invention also provides a leader block rotating mechanism for selectively rotating a leader block to a holding position of holding a film of a web, and to a release position of releasing the film of the web, including means for rotating the leader block to the holding position and to the release position, and means for biasing the rotating means such that the leader block rotates to the holding position.

The present invention also provides a leader block rotating mechanism for selectively rotating a leader block to a holding position of holding a film of a web, and to a release position of releasing the film of the web, including means for rotating the leader block to the holding position and to the release position, and means for driving rotation of the leader block to the release position.

The present invention also provides a method of selectively rotating a leader block to a holding position of holding a film of a web and to a release position of releasing the film of the web, including biasing, by an elastic member, the leader block to the holding position.

The present invention also provides a method of selectively rotating a leader block to a holding position of holding a film of a web and to a release position of releasing the film of the web, including driving, by a motor, rotation of the leader block to the release position.

EXEMPLARY ADVANTAGES OF THE INVENTION

As mentioned above, for example, the present invention may improve the reliability of operation of releasing the holding state of the web (e.g., the leader pin of the tape) by the leader block.

Further, the present invention may achieve the miniaturization of the entire tape cartridge driving unit, since the construction of the leader block rotating mechanism may be simplified.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

FIG. 4A is an exemplary perspective view of an exemplary leader block rotating mechanism 13 from a front side;

FIG. 4B is an exemplary exploded perspective view of exemplary leader block rotating mechanism 13 from the front side;

DETAILED DESCRIPTION OF THE EXEMPLARY EMBODIMENTS

Hereafter, specific exemplary embodiments of the present invention will be described with reference to the drawings. A tape cartridge driving unit will be described below as one example of a read/write device for a web.

Figure 8:
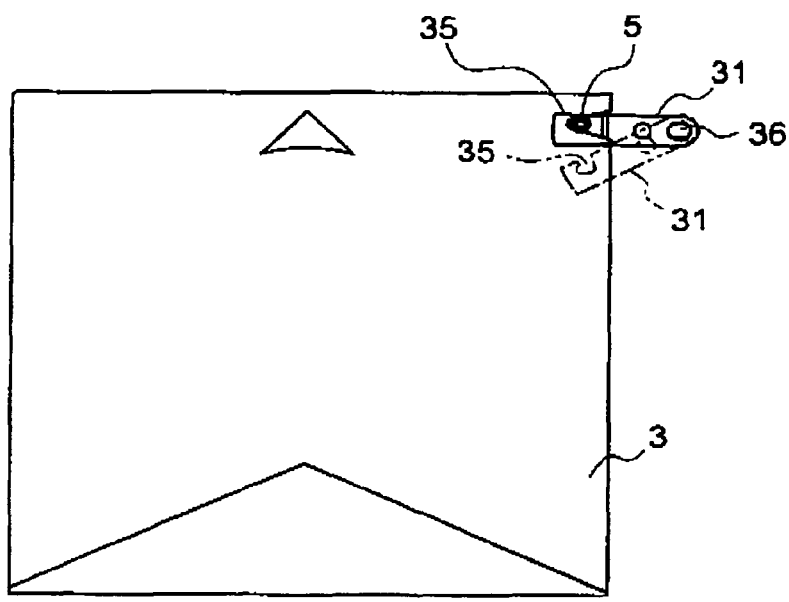
FIG. 8 is an exemplary plan view showing the exemplary operation of exemplary leader block 31 to leader pin 5 of magnetic tape cartridge 3.

In this exemplary embodiment, for example, tape cartridge driving unit I may be a recording and reproducing apparatus in which an LTO (Linear Tape-Open) system cartridge is loaded as a magnetic tape cartridge. Tape cartridge driving unit 1 may be for performing the recording and reproduction of information to a magnetic tape. A reel, around which a magnetic tape is wound, may be contained, in a magnetic tape cartridge, and a leader pin 5 may be provided in an end of the magnetic tape, as shown in FIG. 8.

Figure 1:
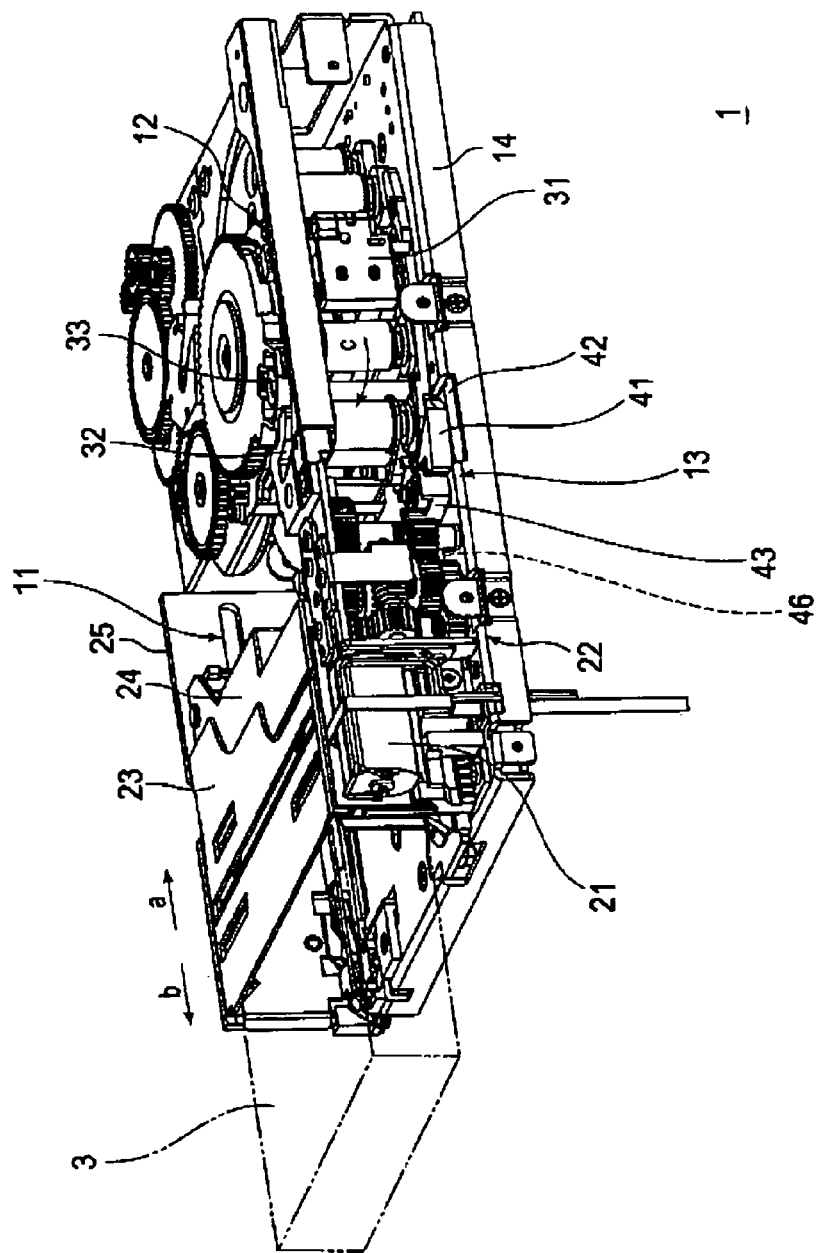
FIG. 1 is an exemplary perspective view showing an interior space of a web (e.g., a tape cartridge 3) driving unit 1 of an exemplary embodiment.

As shown in FIG. 1, tape cartridge driving unit 1 of this exemplary embodiment may include, for example, loading mechanism 11 for carrying magnetic tape cartridge 3 inside the unit, and threading mechanism 12 having leader block 31 holding leader pin 5 of magnetic tape cartridge 3, arranging a magnetic tape along a tape running path, and being for drawing the magnetic tape in a unit side reel (not shown).

In addition, tape cartridge driving unit I may include leader block rotating mechanism 13 for rotating the leader block 31 to a holding position for holding leader pin 5, and a release position for releasing holding of leader pin 5, and chassis 14 supporting these respective mechanisms 11, 12, and 13.

Figure 2:
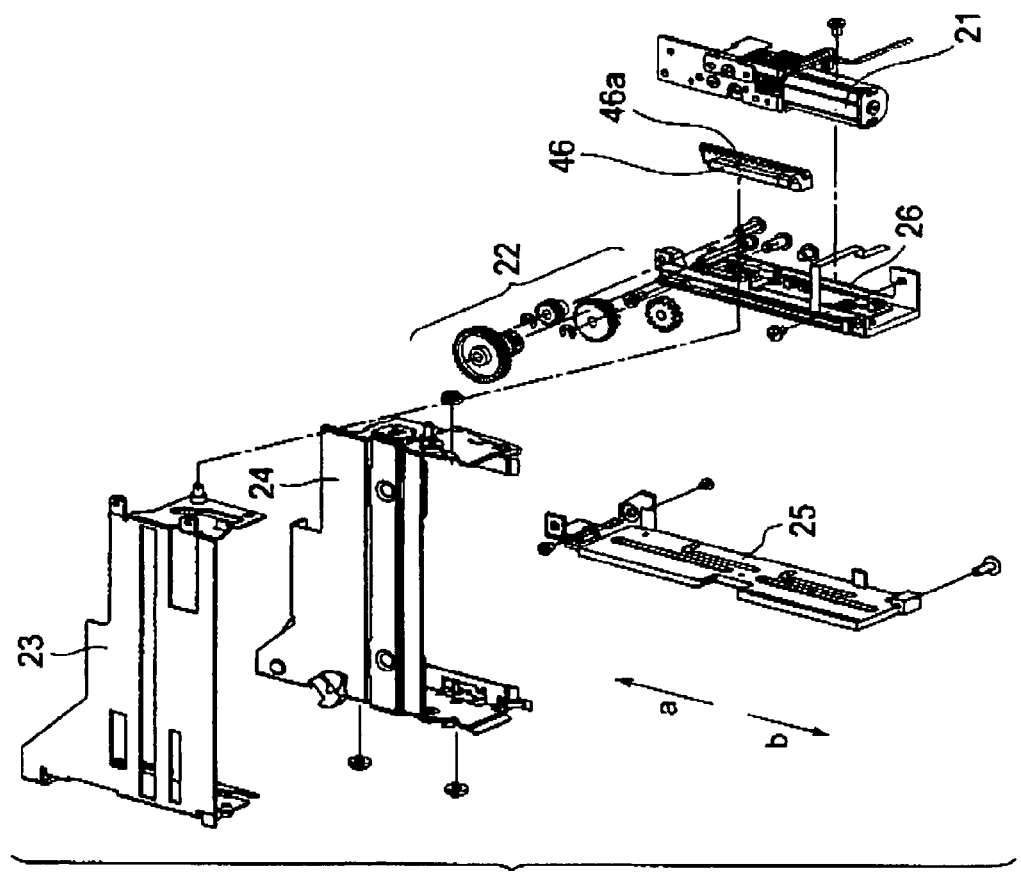
FIG. 2 is an exemplary exploded perspective view showing exemplary loading mechanism 11.

As shown in FIG. 2, for example, loading mechanism 11 may include loading motor 21, gear train 22 for transferring a driving force of loading motor 21, feed bracket 23 to which the driving force is transferred from this gear train 22, and which is moved in respective directions of arrows a and b in FIG. 1, cartridge tray 24 which moves magnetic tape cartridge 3 to an inserting and ejecting position of inserting and ejecting magnetic tape cartridge 3 with feed bracket 23, and a drive position of driving magnetic tape cartridge 3, and a pair of left loader flame 25 and right loader frame 26 which support feed bracket 23 movably.

Figure 3A:
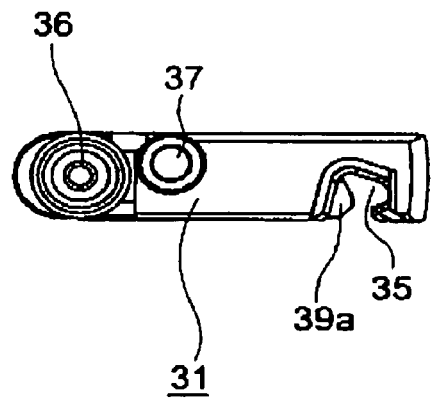
FIG. 3A is an exemplary top view of exemplary leader block 31.
Figure 3B:
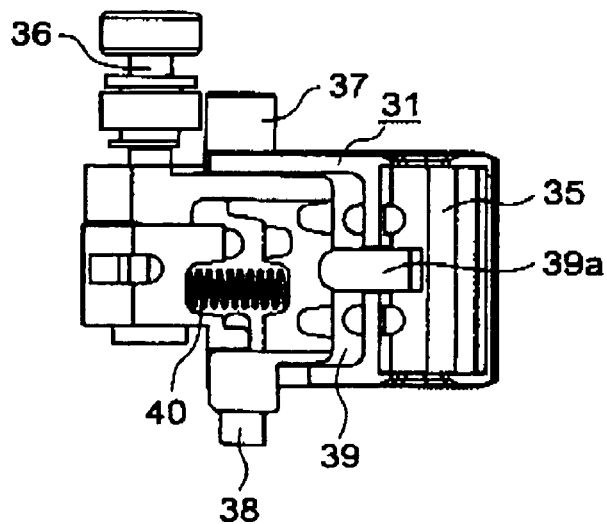
FIG. 3B is an exemplary side view of exemplary leader block 31.

As shown in FIGS. 1 and 3A, threading mechanism 12 may include leader block 31 holding leader pin 5 of magnetic tape cartridge 3, guide groove 32 guiding this leader block 31 movably, and transfer mechanism 33 which includes a threading arm (not shown) supporting leader block 31, and moves leader block 31 along guide groove 32 in directions of arrows c and d in FIG. 1. As shown in FIGS. 3A and 3B, for example, in leader block 31, hook portion 35 for holding leader pin 5 may be provided in the leader block's end side, and rotary shaft 36 rotatably supported by the threading arm of transfer mechanism 33 may be provided in the other end side.

In addition, guide protruding portion 37 for controlling a direction of leader block 31 around rotary shaft 36 may be provided in leader block 31, and this guide protruding portion 37 is engaged with guide groove 32 of threading mechanism 12. Furthermore, in leader block 31, cain protruding portion 38 for rotating leader block 31 around the rotary shaft 36 by leader block rotating mechanism 13 (described further below) may be provided respectively.

Moreover, lock member 39 for locking leader pin 5, held inside hook portion 35, in the holding state may be provided in leader block 31 movably. Lock claw 39a which moves in a concavity which forms hook portion 35, may be formed in lock member 39 as one piece. This lock claw 39a may be energized in a direction of making hook portion 35 protrude by compression spring 40.

As shown in FIGS. 4A, 4B, and FIGS. 5A and 5B, leader block rotating mechanism 13 may include rotator 41 for rotating leader block 31 to the holding position and the release position which are described above, rotator base 42 for supporting this rotator 41 in directions of arrows e and f rotatably, first elastic member (e.g., first torsion spring 44) for providing bias (e.g., energization) so as to rotate rotator 41 in a state of rotating leader block 31 to the holding position, rotator lever 43 for rotating rotator 41, second elastic member (e.g., second torsion spring 45) provided in rotator lever 43, feed plate 46 which may be an actuating member which moves rotator lever 43, and unlocking member 47 for releasing the lock state by lock member 39 of leader block 31.

Figure 5B:
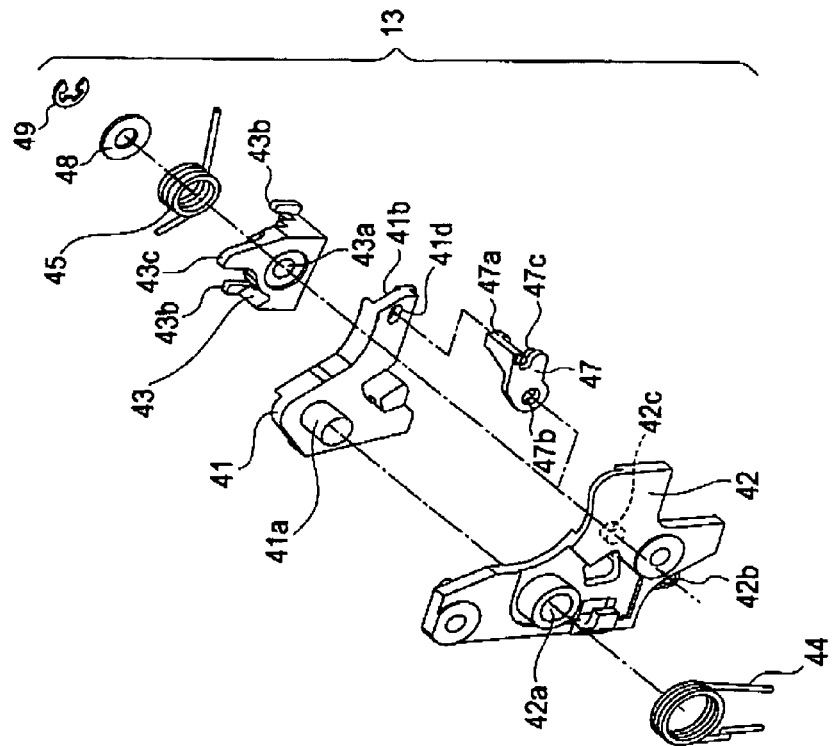
FIG. 5B is an exemplary exploded perspective view of exemplary leader block rotating mechanism 13 from a backside.
Figure 5A:
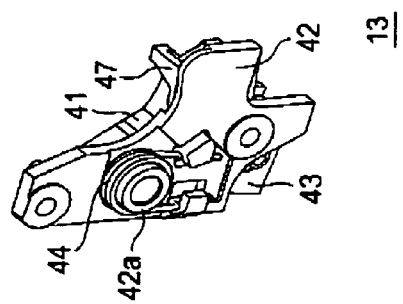
FIG. 5A is an exemplary perspective view of exemplary leader block rotating mechanism 13 from the back side.

As shown in FIGS. 5A and 5B, for example, in rotator 41, rotary shaft portion 41a supported by rotator base 42 rotatably may be formed as one piece. In addition, cam groove 41b which rotates leader block 31 around rotary shaft 36 may be formed in rotator 41, which makes hook portion 35 of leader block 31 where cam protruding portion 38 advances into this cam groove 41b, access to and separate from leader pin 5.

In addition, butting piece 41c for abutting on rotator lever 43 in rotator 41 may be formed as one piece. Further, as shown in FIG. 5B, slot-like regulatory groove 41d for regulating a rotating range of unlocking member 47, may be formed in a back side of rotator 41.

As shown in FIG. 1, rotator base 42 may be fixedly provided on chassis 14, and shaft hole portion 42a which supports rotary shaft portion 41a of rotator 41 rotatably may be formed. As shown in FIGS. 4A and 4B, in rotator base 42, rotary shaft portion 42b supporting rotator lever 43 rotatably may be provided as one piece (e.g., a unitary construction). In addition, boss portion 42c supporting unlocking member 47 rotatably may be provided in rotator base 42.

First elastic member (e.g., first torsion spring 44) may be provided in an outer peripheral portion of shaft hole portion 42a of rotator base 42 as shown in FIG. 5A. An end of the first elastic member is caught and held by rotator 41, and another end of the first elastic member is caught and held by rotator base 42. Hence, first torsion spring 44 biases (e.g., energizes) rotator 41 in a direction of arrow e (as shown in FIG. 4A) with an elastic force around rotary shaft portion 41a.

As shown in FIGS. 4A and 4B, in rotator lever 43, shaft hole portion 43a supported rotatably by rotary shaft portion 42b of rotator base 42 may be formed. In addition, in rotator lever 43, a pair of latch pieces 43b by which both ends of second torsion spring 45 are caught and held, respectively, may be formed. In addition, in rotator lever 43, abutting piece 43c abutted by abutting piece 41c of rotator 41 may be formed as one piece (e.g., unitary or integral construction), and this abutting piece 43c rotates rotator 41.

A second elastic member (e.g., second torsion spring 45) may be fixedly provided on an outer peripheral portion of shaft hole portion 43a of rotator lever 43 by washer 48 and latch 49. As for second torsion spring 45, both ends may be caught and held by latch piece 43b of rotator lever 43. Then, an end of the second elastic member (e.g., second torsion spring 45) is extended to a moving area of an actuating member (e.g., feed plate 46), and rotator lever 43 is rotated in a direction of arrow e by an end portion of feed plate 46 being abutted.

Because of the second elastic member (e.g., second torsion spring 45), even if the actuating member (e.g., feed plate 46) excessively moves in a direction of arrow a, a thrust by the actuating member (e.g., feed plate 46) may be absorbed, since an end side of the second elastic member which is abutted by an end portion of feed plate 46 elastically deforms. Thus, the thrust directly acting on rotator lever 43 may be suppressed.

As shown in FIG. 2, feed plate 46 may be fixed to feed bracket 23 of loading mechanism 11, rack 46a meshing with an end of gear train 22 may be formed along directions of arrows a and b. Thus, feed plate 46 may function also as a rack which transfers a driving force of loading motor 21 to feed bracket 23, while also functioning as an actuating member for rotating rotator lever 43. Then, leader block rotating mechanism 13 may change a moving direction of feed plate 46 to directions of arrows a and b, respectively, by changing a rotary direction of loading motor 21 by a control circuit (not shown).

As shown in FIG. 4B, unlocking member 47 may abut on lock member 39 of leader block 31, and abutting piece 47a for moving lock claw 39a may be formed as one piece. In this unlocking member 47, shaft hole 47b which is rotatably supported by boss portion 42c of rotator base 42 may be formed. In addition, in unlocking member 47, regulatory pin 47c engaged in regulatory groove 41d of rotator 41 may be formed as one piece.

Regarding tape cartridge driving unit 1 constructed as described above, an exemplary operation of leader block rotating mechanism 13 rotating leader block 31, and an exemplary operation of leader block 31 of threading mechanism 12 holding and releasing leader pin 5 will be explained below.

In this exemplary operation, first, in tape cartridge driving unit 1, when magnetic tape cartridge 3 is moved to the drive position from the insertion and ejection position by loading mechanism 11, leader block 31 of threading mechanism 12 is made to wait in a position of facing a magnetic head (not shown) as shown in FIG. 1 in an exemplary initial state.

Figure 6A:
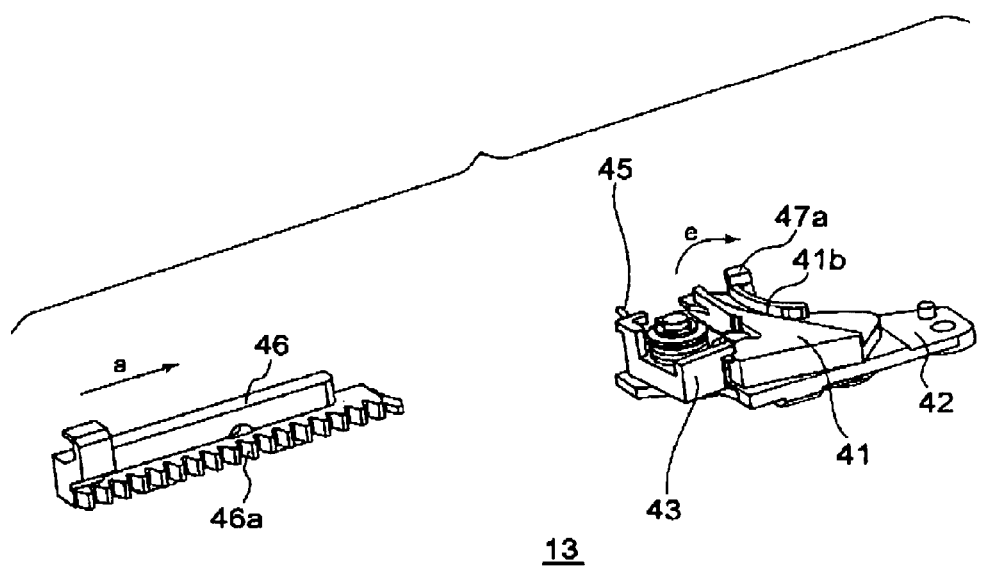
FIG. 6A is an exemplary perspective view for explaining exemplary operation of exemplary leader block rotating mechanism 13.

In connection with the loading operation by loading mechanism 11, magnetic tape cartridge 3 is moved to the drive position, and after the loading operation is completed, as shown in FIG. 6A, feed plate 46 is further moved in the direction of arrow a by interlocking with the loading operation. In addition, since rotator 41 is rotated in a direction of arrow e by an energizing force of first torsion spring 44 in an initial state, leader block 31 is made to rotate to the holding position.

Figure 6B:
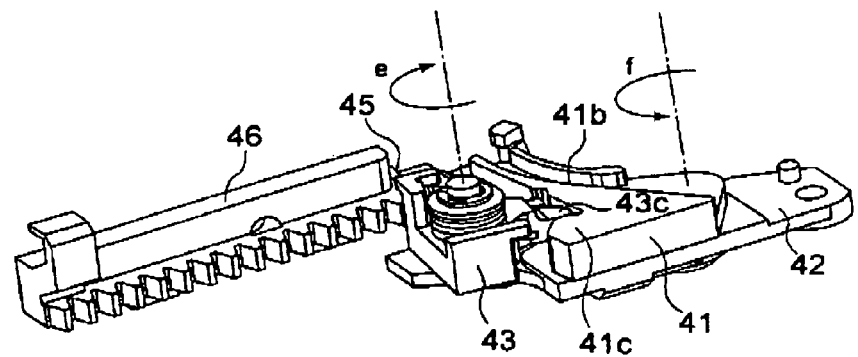
FIG. 6B is another exemplary perspective view for explaining the exemplary operation of exemplary leader block rotating mechanism 13.

Then, as shown in FIG. 6B, since feed plate 46 is further moved in a direction of arrow a, an end portion of this feed plate 46 abuts on an end portion of second torsion spring 45, and rotator lever 43 is rotated in the direction of arrow e through second torsion spring 45. Since rotator lever 43 is rotated in the direction of arrow e, it rotates rotator 41 in the direction of arrow f by resisting the bias (e.g., energizing force) of first elastic member 44 (e.g., first torsion spring 44). Since rotator 41 is rotated in the direction of arrow f, rotator 41 is shifted to a state of rotating leader block 31 to the release position.

Figure 7A:
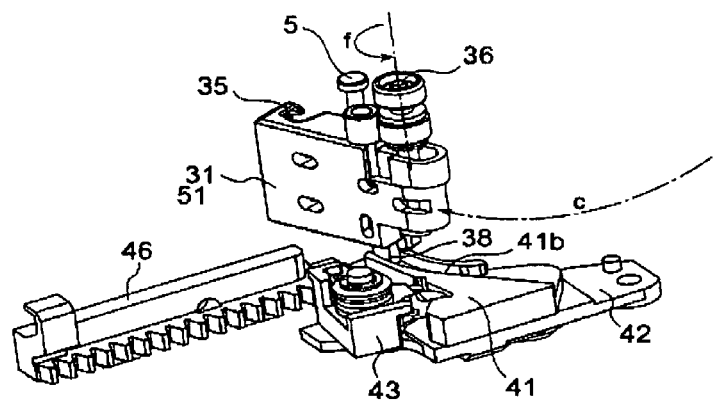
FIG. 7A is yet another exemplary perspective view for explaining the exemplary operation of exemplary leader block rotating mechanism 13.

Then, as shown in FIG. 7A, since threading mechanism 12 moves leader block 31 in the direction of arrow c to make cam protruding portion 38 of leader block 31 advance into cam groove 41b of rotator 41 which is rotated in the direction of arrow f, leader block 31 is rotated around rotary shaft 36 to be set in the release position 51 separated from leader pin 5. At this time, as shown in FIG. 8, leader block 31 advances into the interior space of magnetic tape cartridge 3 to reach about (engage) leader pin 5.

In addition, in leader block 31, since abutting piece 47a of unlocking member 47 is abutted by lock member 39 when cam protruding portion 38 moves to an end portion of cam groove 41b of rotator 41, lock claw 39a is moved from the inside of hook portion 35 so that leader block 31 may hold leader pin 5 in hook portion 35.

Figure 7B:
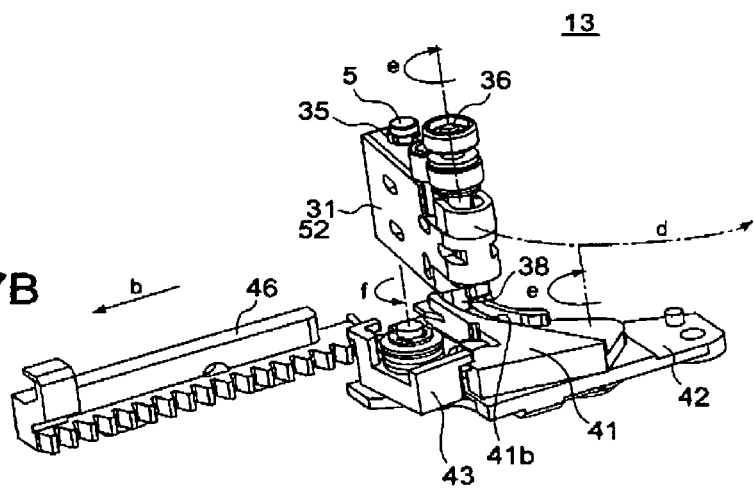
FIG. 7B is still another exemplary perspective view for explaining the exemplary operation of exemplary leader block rotating mechanism 13.

Next, as shown in FIG. 7B, leader block rotating mechanism 13 moves the actuating member (e.g., feed plate 46) by a predetermined amount in the direction of arrow b by performing counter rotation of loading motor 21, and releases a pressure state of the second elastic member (e.g., second torsion spring 45) by the actuating member (e.g., feed plate 46). Rotator 41 is rotated in the direction of arrow e by an energizing force of first torsion spring 44 in connection with this release of the pressure state. Hence, as shown in FIG. 8, leader block 31 is rotated in the direction of arrow e around rotary shaft 36 by cam protruding portion 38 engaged in cam groove 41 b since rotator 41 is rotated in the direction of arrow e, and holds leader pin 5 with hook portion 35 in the holding position 52.

In addition, since unlocking member 47 is rotated independently of rotator 41, abutting piece 47a follows lock member 39 of leader block 31, rotating around rotary shaft 36, to be able to maintain the unlocking state satisfactory.

Then, leader block 31 is moved in the direction of arrow d by threading mechanism 12 for lock claw 39a to be protruded inside hook portion 35 in connection with abutting piece 47a of unlocking member 47 being separated from lock member 39, and is locked in a state of holding leader pin 5 with hook portion 35. Then, since threading mechanism 12 moves leader block 31 holding leader pin 5 in the direction of arrow d, the magnetic tape of magnetic tape cartridge 3 is arranged along the tape running path.

On the other hand, when returning leader pin 5 to magnetic tape cartridge 3, since leader block 31 holding leader pin 5 advances into cain groove 41b of rotator 41 by threading mechanism 12, abutting piece 47a of unlocking member 47 abuts on lock member 39 to release the lock state by lock claw 39a. Subsequently, since rotator 41 is rotated in the direction of arrow f by feed plate 46 being moved in the direction of arrow a, leader block 31 is rotated to the release position, to release the holding state of leader pin 5 by hook portion 35. Hereafter, leader block rotating mechanism 13 performs operations contrary to the sequence of a series of operations mentioned above.

As an example described above, in leader block rotating mechanism 13 with which tape cartridge driving unit 1 of this exemplary embodiment is equipped, the actuating member (e.g.:, feed plate 46) may be moved by loading motor 21 by an initial state of rotator 41 being made in a state of rotating leader block 31 to the holding position, and hence, rotator 4 1 is moved to a state of rotating leader block 31 to the unlocking position. Therefore, since rotator 41 is rotated by the movement of the actuating member 46 (e.g., feed plate 46) when in a state of rotating leader block 31 to the release position, the reliability of releasing the holding state of leader pin 5 by leader block 31 may be improved, in comparison with the construction of being rotated with the energizing force of the first elastic member (e.g., first torsion spring 44).

Further, as for leader block rotating mechanism 13 of this exemplary embodiment, although leader pin 5 may not be held without leader block 31 being rotated satisfactorily in the holding position when an energizing force of first coil spring 44 lessens over time (e.g., time-dependent change), this situation may be remedied by repeating the holding action of leader pin 5 by leader block 31. Since the magnetic tape may not be extracted from magnetic tape cartridge 3 when holding leader pin 5 by leader block 31, the magnetic tape may not be damaged. That is, due to this exemplary leader block rotating mechanism 13, damage (e.g., as described with regard to the conventional structure) to a magnetic tape due to reduction of the energizing force of the first coil spring, can be avoided.

Then, due to this exemplary tape cartridge driving unit 1, since the construction of leader block rotating mechanism 13 may be simplified, the miniaturization of an entire tape cartridge driving unit may be achieved.

In addition, in this exemplary embodiment, the second elastic member (e.g., second torsion spring 45) which abuts on the actuating member (e.g., feed plate 46) is fixedly provided on the rotator lever of the leader block rotating mechanism according to the present invention. Due to this exemplary construction, since the actuating member may move the rotator lever through the other spring, even if the actuating member is excessively moved, a thrust by the actuating member may be absorbed by the second elastic member (e.g., second torsion spring 45) being elastically deformed. Thus, thrust on rotator lever 43 may be suppressed. Hence, damage to rotator lever 43 and rotator 41 caused by the thrust of the actuating member (e.g., feed plate 46) may be suppressed. Hence, operational reliability is increased. In addition, in leader block rotating mechanism 13 mentioned above, the rotary shaft portion 42b which supports rotator lever 43 rotatably may be provided in rotator base 42. However, instead of this shaft section 42b, it may be configured by providing a revolution of this shaft on chassis 14 instead of this rotary shaft portion. Furthermore, rotator base 42 may be formed as one piece with chassis 14, and each part or a portion of a part may be constructed by a plurality of pieces, or each part may be constructed as one piece.

Moreover, although the second torsion spring 45 is provided in rotator lever 43 in the exemplary leader block rotating mechanism 13 mentioned above, an elastic member, such as a leaf spring on which an end portion of a feed plate is abutted, may be fixedly provided in a rotator lever, or an elastic member, such as a rubber, may be provided in an end portion of a feed plate abutted on a rotator lever, and the rotator lever or a rotator is rotated through this elastic member. Since thrust is absorbed by the feed plate, the above-mentioned constructions may also suppress the thrust acting on the rotator lever.

In addition, tape cartridge driving unit I mentioned above may be applied to a data storage system in which, for example, two or more tape cartridge driving units are arranged, and which may provide a cartridge carrying mechanism for transporting a magnetic tape cartridge to each tape cartridge driving unit, and inserting and ejecting the cartridge to a cartridge tray.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

For example, while a leader block rotating mechanism for a tape cartridge has been described above in the exemplary embodiment, the invention would be equally applicable to any leader block rotating mechanism for a wound material (e.g., web).

Further, the inventor's intent is to encompass all equivalents of all the elements of the claimed invention even if the claims are amended during prosecution.

This application is based on Japanese Patent Application No. 2005-139894 filed on May 12, 2005 and including specification, claims, drawings and summary. The disclosure of the above Japanese Patent Application is incorporated herein by reference in its entirety.

What is claimed is:

1. A leader block rotating mechanism for selectively rotating a leader block to a holding position of holding a film of a web, and to a release position of releasing said film of said web, comprising:
   a rotator that rotates said leader block to said holding position; and
   an elastic member operatively connected to the rotator and biasing said rotator such that said leader block is rotated to said holding position,
   wherein said leader block rotating mechanism is included in a read/write device comprising a loading motor, and
   wherein the leader block rotating mechanism further comprises a rotator lever that rotates said rotator, and an actuating member that actuates said rotator lever by transmitting a driving force of said motor to said rotator lever.

2. The leader block rotating mechanism according to claim 1, wherein said rotator rotates said leader block to said release position by transmitting a driving force of said motor to said leader block.

3. The leader block rotating mechanism according to claim 2, said leader block including a earn protruding portion, wherein said rotator includes:
a cam groove that is engagable with said cam protruding portion of said leader block.

4. The leader block rotating mechanism according to claim 1, wherein said elastic member comprises a first elastic member, wherein said rotator includes: a second elastic member that is fixed to said rotator lever, said actuating member being abuttable to said second elastic member.

5. The leader block rotating mechanism according to claim 4, said first elastic member being supportable on a first axis, said mechanism further comprising:
a rotator base that rotatably supports said rotator lever on a second axis, wherein said second elastic member includes: a second torsion spring fixedly provided on an outer peripheral portion of said second axis, first and second ends of said second torsion spring being held by said rotator lever, said first end of said second torsion spring being extended to a moving area of said actuating member.

6. The leader block rotating mechanism according to claim 1, wherein said web includes:
a magnetic tape cartridge that includes a magnetic tape, said magnetic tape including a leader pin at a free end thereof, wherein said leader pin is holdable by said leader block.

7. A read/write device for a web, comprising:
said leader block rotating mechanism in claim 1; and
said leader block that holds said film of said web.

8. The read/write device according to claim 7, wherein said leader block includes: a lock member that locks said leader block into a state of holding said web, and
wherein said read/write device further includes: an unlocking member that releases said leader block into a state of releasing said web.

9. The read/write device according to claim 7, wherein said read/write device reads/writes a data from/into said web.

10. The leader block rotating mechanism according to claim 1, further comprising:
a rotator base for supporting the rotator, the elastic member including an end which is held by the rotator and another end which is held by the rotator base.

11. The leader block rotating mechanism according to claim 1, wherein the rotator comprises a holding member, and the elastic member comprises a torsion spring having an end which is held by the holding member.

12. The leader block rotating mechanism according to claim 11, wherein the rotator comprises a rotary shaft portion, and the torsion spring comprises a coiled portion formed around the rotary shaft portion and biases the rotator with an elastic force around the rotary shaft portion.

13. A leader block rotating mechanism for selectively rotating a leader block to a holding position of holding a film of a web, and to a release position of releasing said film of said web, comprising:
rotator that rotates said leader block to said holding position; and
an elastic member operatively connected to the rotator and biasing said rotator such that said leader block is rotated to said holding position,
wherein said leader block rotating mechanism is included in a read/write device comprising a loading motor,
wherein said rotator rotates said leader block to said release position by transmitting a driving force of said motor to said leader block, and
wherein said leader block rotating mechanism further comprises:
a rotator base that rotatably supports said rotator on an axis, wherein said elastic member includes a torsion spring provided in an outer peripheral portion of, said axis, a first end of said torsion spring being held by said rotator, a second end of said torsion spring being held by said rotator base, said torsion spring biasing said rotator in a direction of rotating said leader block to said holding position.

14. A leader block rotating mechanism for selectively rotating a leader block to a holding position of holding a film of a web, and to a release position of releasing said film of said web, comprising:
a rotator that rotates said leader block to said release position; and
an elastic member operatively connected to the rotator and biasing said leader block to said holding position,
wherein said leader block rotating mechanism is included in a read/write device including a loading motor,
wherein said rotator rotates said leader block to said release position by transmitting a driving force of said motor to said leader block, and
wherein the leader block rotating mechanism further comprises a rotator lever that rotates said rotator, and an actuating member that actuates said rotator lever by transmitting a driving force of said motor to said rotator lever.

15. A leader block rotating mechanism for selectively rotating a leader block to a holding position of holding a film of a web, and to a release position of releasing said film of said web, comprising:
rotating means for rotating said leader block to said holding position and to said release position; and
biasing means operatively connected to the rotating means and biasing said rotating means such that said leader block rotates to said holding position,
wherein said leader block rotating mechanism is included in a read/write device comprising a loading motor, and
wherein the leader block rotating mechanism further comprises rotator rotating means for rotating, said rotator and actuating means for actuating said rotator rotating means by transmitting a driving force of said motor to said rotator rotating means.

16. A leader block rotating mechanism for selectively rotating a leader block to a holding position of holding a film of a web, and to a release position of releasing said film of said web, comprising:
rotating means for rotating said leader block to said holding position and to said release position; and
biasing means operatively connected to the rotating means and biasing said rotating means such that said leader block is rotated to said holding position,
wherein said leader block rotating mechanism is included in a read/write device including a loading motor,
wherein said rotating means rotates said leader block to said release position by transmitting a driving force of said motor to said leader block, and wherein the leader block rotating mechanism further comprises rotator rotating means for rotating said rotator, and actuating means for actuating said rotator rotating means by transmitting a driving force of said motor to said rotator rotating means.

17. A method of selectively rotating a leader block to a holding position of holding a film of a web and to a release position of releasing said film of said web, comprising:
    rotating, by a rotator, said leader block to said holding position;
    biasing, by an elastic member operatively connected to the rotator, said rotator such that said leader block is rotated to said holding position,
    wherein said leader block is included in a read/write device comprising a loading motor, and
    wherein the read/write device further includes a leader block rotating mechanism which includes the rotator, a rotator lever that rotates said rotator, and an actuating member that actuates said rotating lever by transmitting a driving force of said motor to said rotator lever.

18. A method of selectively rotating a leader block to a holding position of holding a film of a web and to a release position of releasing said film of said web, comprising:
    rotating, by a rotator, said leader block to said release position;
    biasing, by an elastic member operatively connected to the rotator, said rotator such that said leader block is rotated to said holding position; and
    driving, by a motor, rotation of said rotator such that said leader block is rotated to said release position,
    wherein said leader block is included in a read/write device which includes the motor, and
    wherein the read/write device further includes a leader block rotating mechanism which includes the rotator, a rotator lever that rotates said rotator, and an actuating member that actuates said rotator lever by transmitting a driving force of said motor to said rotator lever.

* * * * *